(12) United States Patent
Lo et al.

(10) Patent No.: US 7,125,174 B2
(45) Date of Patent: Oct. 24, 2006

(54) OPTICAL MODULE FOR BI-DIRECTIONAL COMMUNICATION SYSTEM

(75) Inventors: Adrian Lo, Tokyo (JP); Makoto Sekijima, Tokyo (JP); Kenjiro Hata, Tokyo (JP); Tohru Kineri, Onoda (JP); Naoki Hanashima, Tokyo (JP)

(73) Assignee: TDK Corporation, Tokyo (JP)

( * ) Notice: Subject to any disclaimer, the term of this patent is extended or adjusted under 35 U.S.C. 154(b) by 39 days.

(21) Appl. No.: 10/885,105

(22) Filed: Jul. 7, 2004

(65) Prior Publication Data

US 2005/0157988 A1 Jul. 21, 2005

(30) Foreign Application Priority Data

Jan. 15, 2004 (JP) ............................ 2004-008495

(51) Int. Cl.
G02B 6/36 (2006.01)
(52) U.S. Cl. .......................................... 385/92; 385/88
(58) Field of Classification Search .................. 385/92
See application file for complete search history.

(56) References Cited

U.S. PATENT DOCUMENTS

| 5,552,918 | A | 9/1996 | Krug et al. ................. 359/152 |
| 6,332,720 | B1 | 12/2001 | Shimaoka et al. ............ 385/88 |
| 6,493,121 | B1 * | 12/2002 | Althaus ....................... 398/135 |
| 6,652,158 | B1 * | 11/2003 | Bartur et al. ................. 385/92 |
| 2002/0028049 | A1 | 3/2002 | Bartur et al. ................. 385/92 |
| 2004/0218857 | A1 * | 11/2004 | Hung .......................... 385/31 |

FOREIGN PATENT DOCUMENTS

| EP | 0 331 436 A2 | 2/1989 |
| EP | 0 347 120 A2 | 6/1989 |
| EP | 0 542 011 A1 | 10/1992 |
| EP | 0 715 195 A1 | 12/1995 |
| EP | 2003255196 | 2/2002 |
| EP | 0 644 668 B1 | 7/2002 |
| EP | 2002296456 | 10/2002 |
| EP | 2003075687 | 3/2003 |
| JP | 61156208 | 7/1986 |
| JP | 6-160674 | 6/1994 |
| JP | 3095902 | 8/2003 |
| JP | 2003-255196 | 9/2003 |
| JP | 2003-279808 | 10/2003 |
| WO | WO 03/029857 A1 | 7/2002 |
| WO | WO 03/029857 A1 | 4/2003 |

OTHER PUBLICATIONS

European Search Report for Application No. EPP91130 dated May 9, 2005.
European Search Report for Application No. EP04255838 dated Dec. 3, 2004
European Search Report for Application No. EP04255768 dated Dec. 21, 2004.

* cited by examiner

*Primary Examiner*—Sung Pak
(74) *Attorney, Agent, or Firm*—Wolff Law Offices; Kevin Alan Wolff

(57) ABSTRACT

The optical module includes a main housing, a light-emitting component supported by a second attachment section, a light-receiving component and a filter support member supported by a third attachment section, and first and second optical filters supported by the filter support member. The filter support member has a first surface and a second surface. The first optical filter is mounted on the first surface of the filter support member. The second optical filter is mounted on the second surface of the filter support member.

20 Claims, 9 Drawing Sheets

OPTICAL MODULE FOR BI-DIRECTIONAL COMMUNICATION SYSTEM

TECHNICAL FIELD

The present invention relates to an optical module and particularly to an optical module for bi-directional communication system.

BACKGROUND OF THE INVENTION

In recent years, the development of the Internet has made it possible for people to access large quantities of information in real time and to handle large quantities of information. Information is transmitted by copper wire, optical fiber and wirelessly, but optical fiber is particularly superior for sending large volumes of information at high speeds. In the future, optical fiber is expected to be installed in each home.

However, because at the terminal end information is processed using electric signals, not optical signals, an optical module has to be used between an optical fiber and a terminal in order to connect the optical fiber to the terminal. An optical module is a device that converts optical signals received from the optical fiber to electric signals and supplies the electric signals to the terminal, and converts electric signals from the terminal to optical signals that are supplied to the optical fiber. In the prior art, various types of optical module have been proposed.

FIG. 12 is a cross-sectional diagram showing the structure of a conventional optical module 10 described in Japanese Utility Model Registration No. 3,095,902. The optical module 10 includes a main housing 12, an optical fiber 14 supported by the optical module 10, a light-emitting component 16, a light-receiving component 18, a filter support member 20 provided in the main housing 12, and an optical filter 22 supported by the filter support member 20.

In the optical module 10 shown in FIG. 12, the optical fiber 14 and light-receiving component 16 are disposed in a straight line and the light-receiving component 18 is disposed at an angle of 90 degrees to the straight line. The optical filter 22 reflects received light 14a supplied from the optical fiber 14 and transmits transmitted light 16a produced by the light-emitting component 16. The filter support member 20 supports the optical filter 22 at an angle of 45 degrees to the straight line. Thus, received light 14a from the optical fiber 14 is reflected by the optical filter 22 to fall incident on the light-receiving component 18, and transmitted light 16a from the light-emitting component 16 is transmitted by the optical filter 22 to the optical fiber 14.

This arrangement enables an optical signal received from the optical fiber 14 to be converted to an electric signal and supplied to the terminal, and an electric signal provided from the terminal to be converted to an optical signal and supplied to the optical fiber 14, thereby enabling bi-directional communication between terminals using optical signals.

However, in the case of the above optical module 10, the transmitted light 16a produced by the light-emitting component 16 can stray and scatter within the main housing 12, and if this scattered light reaches the light-receiving component 18, it can result in noise, with respect to the received signal. One way of resolving this problem is to provide another optical filter at the light-receiving component 18 end to block stray light.

However, the provision of another member to support the optical filter further increases the number of parts. Moreover, an increase in the number of parts such as the filter support members, which are small and irregular in shape, makes the manufacturing process more complicated and increases the cost of the products.

SUMMARY OF THE INVENTION

It is therefore an object of the present invention to provide an improved optical module that enables bi-directional communication.

Another object of the present invention is to provide an optical module that reduces noise caused by stray light while keeping down the increase in small, irregularly-shaped parts.

The above and other objects of the present invention can be accomplished by an optical module, comprising:

a main housing having a first attachment section that can affix an optical fiber, a second attachment section located in opposition to the first attachment section, and a third attachment section provided at a first angle to a straight line which connects the first and second attachment sections;

a light-emitting component supported by the second attachment section;

a light receiving component supported by the third attachment section;

a filter support member supported by the third attachment section; and first and second optical filters supported by the filter support member, the filter support member having a first surface which has a second angle different from the first angle to the straight line and a second surface which is substantially perpendicular to the light-receiving component, the first optical filter being mounted on the first surface of the filter support member, the second optical filter being mounted on the second surface of the filter support member.

According to the present invention, two optical filters are supported by a single filter support member, making it possible to keep down the increase in the number of parts. Also, the optical filters can be positioned with good precision, with almost no deviation arising in the positional relationship of the filters. Moreover, having the filter support member and light-receiving component supported by the third attachment section is also advantageous in that deviation does not readily arise in the positional relationship of the two filters and the light-receiving component.

In a preferred aspect of the present invention, the second angle to be half the first angle. Thus, it is preferable for the first angle to be substantially 90 degrees and the second angle substantially 45 degrees. In accordance with this arrangement, having the first optical filter reflecting light supplied by the optical fiber and transmitting light produced by the light-emitting component makes it possible for light from the optical fiber to fall incident on the light-receiving component and light emitted by the light-emitting component to be supplied to the optical fiber.

In a further preferred aspect of the present invention, the first optical filter can reflect a light supplied from the optical fiber and can transmit a light emitted from the light-emitting component, the second optical filter can transmit a light supplied from the optical fiber and can reflect a light emitted from the light-emitting component. According to this aspect of the present invention, even if light from the light-emitting component should stray and scatter inside the main housing, it does not reach the light-receiving component but is blocked by the second optical filter. This makes it possible to reduce noise caused by stray light.

In a further preferred aspect of the present invention, the filter support member has a cap portion, the cap portion of the filter support member being put into the third attachment portion, the light-receiving component being put into the cap portion of the filter support member. According to this aspect of the present invention, the light-receiving component and filter support member can be held securely by the third attachment section.

In a further preferred aspect of the present invention, the filter support member further has first and second projecting portions each of which has the first surface, the straight line passing between the first and second projecting portions. According to this aspect of the present invention, light from the light-emitting component can be securely supplied to the optical fiber without being blocked by the filter support member.

In a further preferred aspect of the present invention, the cap portion of the filter support member includes a cylindrical portion intervening between the third attachment section of the main housing and the light-receiving component and a stop portion provided one end of the cylindrical portion that functions as a stop for the light-receiving component. According to this aspect of the present invention, the light-receiving component can be accurately positioned relative to the filter support member.

In a further preferred aspect of the present invention, the cap portion of the filter support member includes a first cylindrical portion intervening between the third attachment section of the main housing and the light-receiving component, a second cylindrical portion having smaller diameter than that of the first cylindrical portion, a stop portion connecting the first and second cylindrical portions, and a filter mounting portion provided one end of the second cylindrical portion having an opening, in which the stop portion functions as a stop for the light-receiving component and the filter mounting portion has the second surface. According to this aspect of the present invention, any lenses or other projecting parts included in the light-receiving component do not interfere with the filter support member.

In a further preferred aspect of the present invention, the optical module further comprises a slider attached to the first attachment section which can adjust a position of the optical fiber in a direction along an optical axis. More preferably, the slider has a cylindrical structure into which a ferrule can be inserted.

In a further preferred aspect of the present invention, the optical module further comprises another slider attached to the first attachment section which can adjust a position of the optical fiber in a direction perpendicular to the optical axis.

In another preferred aspect of the present invention, the second attachment section can adjust a position of the light-emitting component in a direction perpendicular to the optical axis.

These arrangements enable light emitted by the light-emitting component to be efficiently supplied to the optical fiber.

In a further preferred aspect of the present invention, the main housing has a cylindrical structure, the first attachment section being located at one end of the main housing and the second attachment section being located at an opposite end of the main housing.

In a further preferred aspect of the present invention, the main housing has a cavity at the third attachment section to accommodate at least part of the cap portion of the filter support member. Providing a cavity makes it possible to increase the strength of received signals by bringing the end of the optical fiber closer to the light-receiving component.

In a further preferred aspect of the present invention, the first attachment section can fix the optical fiber with a tilt for the straight line that preferably is not more than 5 degrees.

Even when the optical fiber is cut at a predetermined inclination this arrangement makes it possible to compensate for the effects of the inclination, thereby ensuring that the optical fiber is efficiently connected to the light-emitting component.

Thus, in accordance with this invention, it is possible to reduce noise caused by stray light without increasing the number of small, irregularly-shaped filter support members, thereby making it possible to provide a high-performance optical module at a low cost.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will now be described with reference to the drawings.

Figure 1:
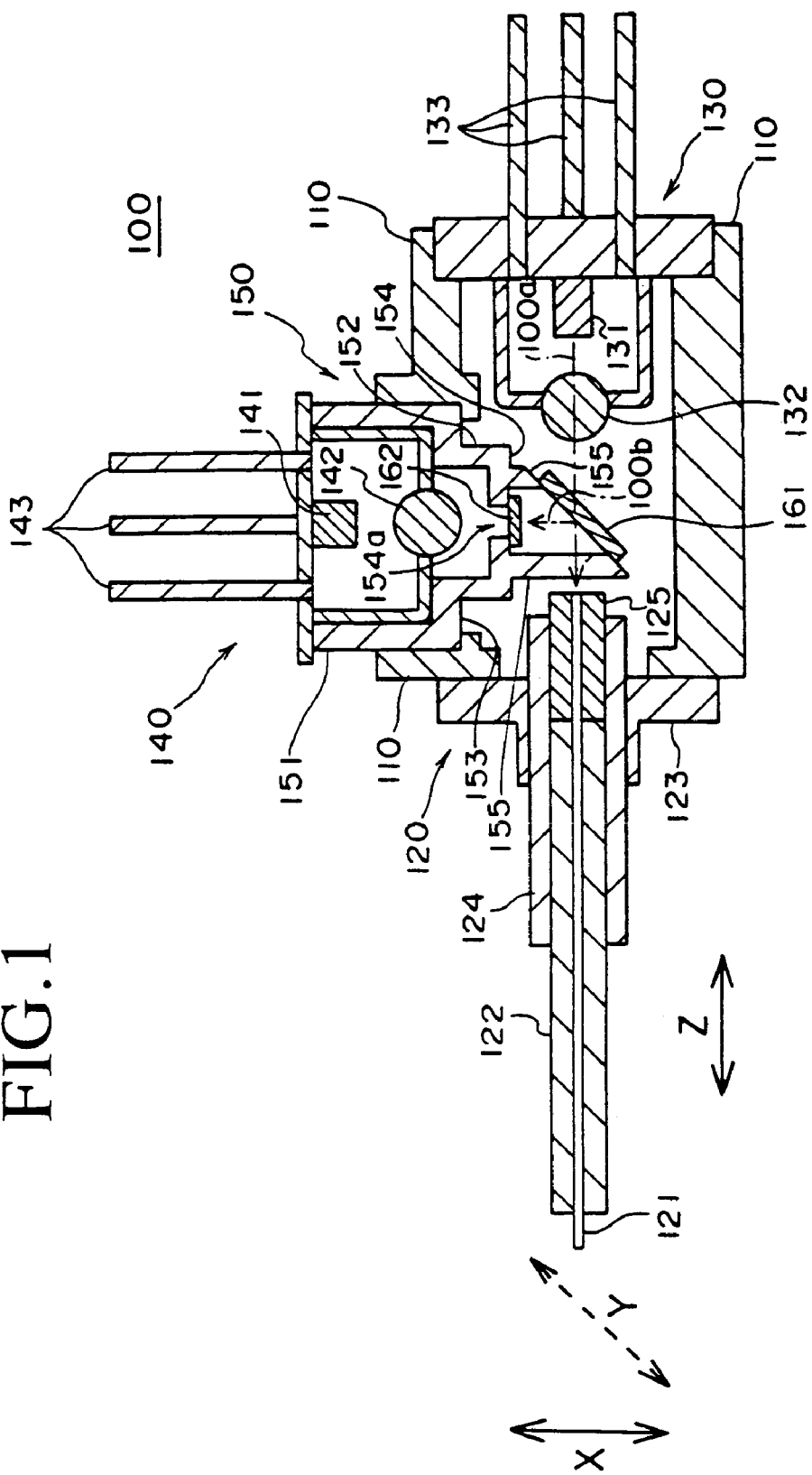
FIG. 1 is a cross-sectional view of the configuration of an optical module according to a preferred embodiment of the present invention.
Figure 2:
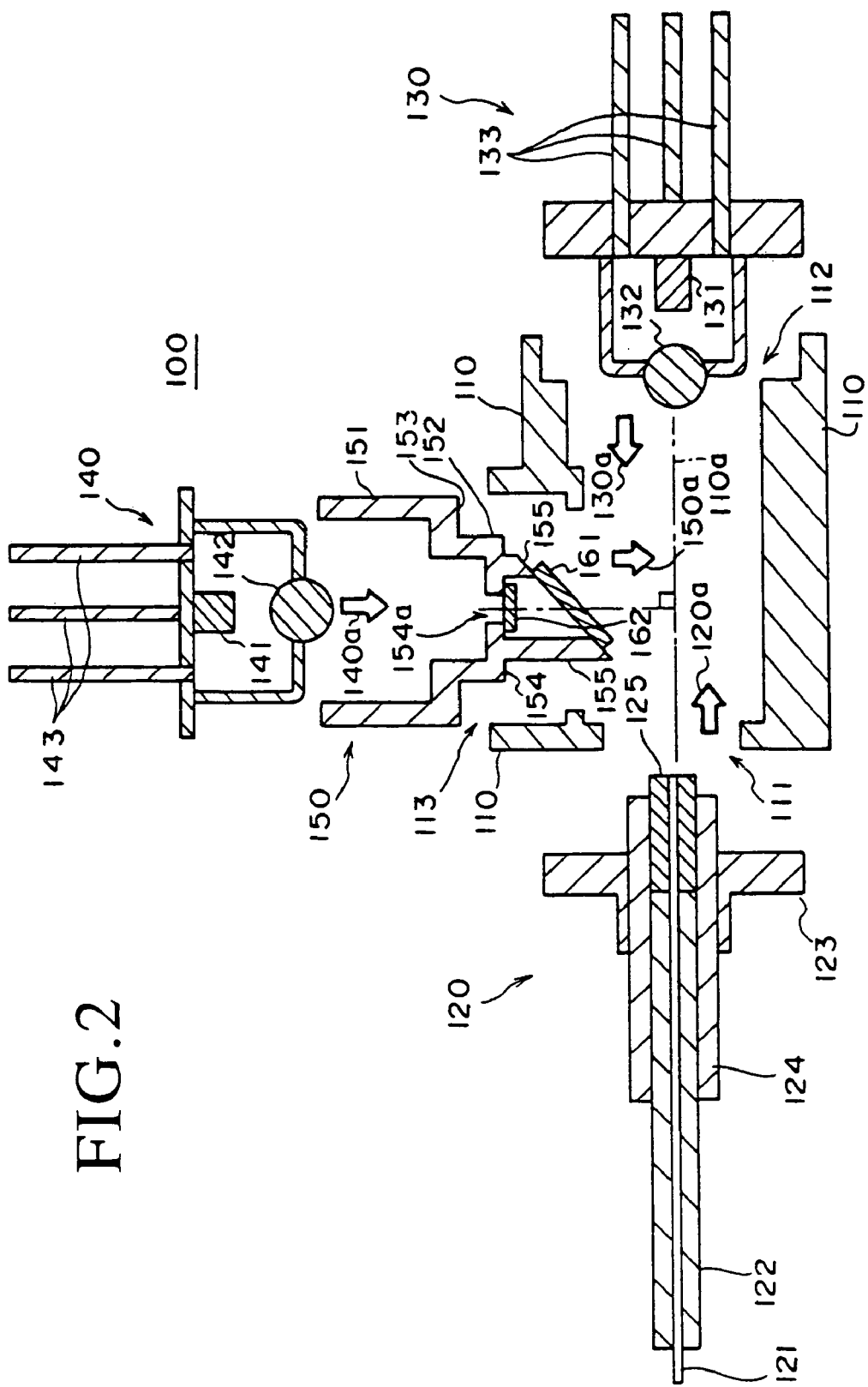
FIG. 2 is an exploded cross-sectional view of the optical module shown in FIG. 1.

FIG. 1 is a cross-sectional view of the configuration of an optical module 100 according to a preferred embodiment of the present invention, and FIG. 2 is an exploded cross-sectional view of the optical module 100.

As shown in FIGS. 1 and 2, the optical module 100 according to this embodiment includes a main housing 110, a fiber support component 120 affixed to the main housing 110, a light-emitting component 130, a light-receiving component 140, a filter support member 150 provided so that it covers the light-receiving component 140, and first and second optical filters 161 and 162 that are held by the filter support member 150. The optical module 100 is used to carry out bi-directional communication between terminals using optical signals. The optical module 100 does this by receiving optical signals from an optical fiber 121 that have a wavelength of, for example, about 1500 nm and converting them to electric signals, and converting electric signals from a terminal to optical signals that have a wavelength of, for example, about 1300 nm, and supplying the optical signals to the optical fiber 121.

The main housing 110 has a cylindrical structure. As shown in FIG. 2, one end of the main housing 110 is provided with a first attachment section 111 for affixing the fiber support component 120, and the other end has a second attachment section 112 for affixing the light-emitting component 130. A third attachment section 113 that is provided for affixing the light-receiving component 140, is positioned at an angle of 90 degrees with respect to a straight line 110a connecting the first and second attachment sections 111 and 112. Preferably, the third attachment section 113 has a cavity shaped to allow accommodation of part of the filter support member 150. While there is no particular limitation on the material of the main housing 110, from the standpoint of mechanical strength and machining precision, it is preferable to use metal.

The fiber support component 120 is attached in the direction indicated by the arrow 120a in FIG. 2, and is thereby held by the first attachment section 111, where it functions by holding the end of the optical fiber 121 as the optical signal transmission medium, and the optical fiber cover 122. The fiber support component 120 includes a ring-shaped first slider 123, and a cylindrical second slider 124 into which is inserted a ferrule 125 that holds the end portion of the optical fiber 121. With respect to the main housing 110, the first slider 123 can slidably move in the X direction (vertically with respect to FIG. 1) and the Y direction (normal to the page on which FIG. 1 is drawn), which allows the position of the optical fiber 121 to be adjusted perpendicularly to the optical axis. The second slider 124 can slidably move in the Z direction (from side to side with respect to FIG. 1) relative to the first slider 123, which allows the position of the optical fiber 121 to be adjusted along the line of the optical axis. While there is no particular limitation on the material of the first and second sliders 123 and 124, from the standpoint of mechanical strength and machining precision, it is preferable to use metal.

The light-emitting component 130 is attached in the direction indicated by the arrow 130a in FIG. 2, and is thereby held by the second attachment section 112. The light-emitting component 130 includes a light-emitting element 131, such as a laser diode or the like, a lens 132 that concentrates the transmitting light 100a emitted by the light-emitting element 131, and signal pins 133 that receive the electric signals from a terminal. The function of the light-emitting component 130 is to use the light-emitting element 131 to convert an electric signal received from the terminal via the signal pins 133 into an optical signal, and transmit the optical signal to the optical fiber 121, via the lens 132. The lens 132 is not an essential component of the light-emitting component 130, and may therefore be omitted.

The light-receiving component 140 and filter support member 150 are attached in the directions indicated by the arrows 140a and 150a in FIG. 2, whereby they are held by the third attachment section 113. The light-receiving component 140 includes a light-receiving element 141, such as a photodiode or the like, a lens 142 that concentrates the receiving light 100b from the optical fiber 121 to the light-receiving element 141, and signal pins 143 that supply electric signals to a terminal. The function of the light-receiving component 140 is to use the light-receiving element 141 to convert an optical signal received via the lens 142 into an electric signal, and transmit the electric signal to the terminal, via the signal pins 143. The lens 142 is not an essential component of the light-emitting component 140, and may therefore be omitted.

Figure 3:
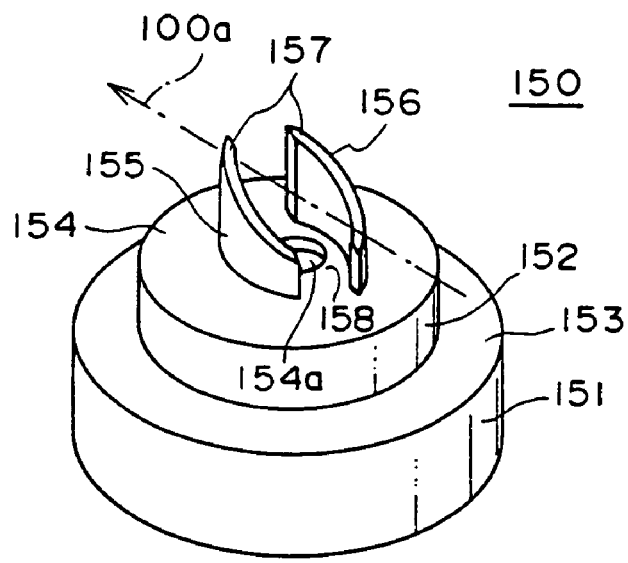
FIG. 3 is a perspective view showing the structure of the filter support member in more detail.

FIG. 3 is a perspective view showing the structure of the filter support member 150 in more detail.

As shown in FIG. 3, the filter support member 150 comprises a first cylindrical portion 151, a second cylindrical portion 152 having a smaller diameter than that of the first cylindrical portion 151, a stop portion 153 that connects the first and second cylindrical portions 151 and 152, a filter mounting portion 154 with an opening 154a provided at one end of the second cylindrical portion 152, and first and second projecting portions 155 and 156 provided on the filter mounting portion 154.

The first cylindrical portion 151, second cylindrical portion 152, stop portion 153 and filter mounting portion 154 comprise a cap portion. During actual use, as shown in FIGS. 1 and 2, the cap portion of the filter support member 150 is set into the third attachment section 113, and the light-receiving component 140 is set into the cap portion. Therefore, when the light-receiving component 140 and filter support member 150 are held by the third attachment section 113, the first cylindrical portion 151 is set between the third attachment section 113 and the light-receiving component 140. The stop portion 153 acts as a stop to the inserted light-receiving component 140, so that the light-receiving component 140 is accurately positioned with respect to the filter support member 150.

As shown in FIG. 3, the first and second projecting portions 155 and 156 are curved parts formed by cutting a section of a cylinder, and are arranged on either side of a straight line connecting the first attachment section 111 and the second attachment section 112, that is, on either side of the path of the transmitting light 100a. This enables the transmitting light 100a from the light-emitting component 130 to be supplied to the optical fiber 121 without being blocked by the filter support member 150.

The first and second projecting portions 155 and 156 each has a surface (first surface) 157 that is at an angle of 45 degrees to the path of the transmitting light 100a. The first optical filter 161 is maintained on this first surface 157. Thus, the first optical filter 161 is maintained at an angle of 45 degrees to the path of the transmitting light 100a. The filter mounting portion 154 also has a surface (second surface) 158 that is substantially perpendicular to the light-receiving component 140, and on which the second optical filter 162 is maintained.

The first optical filter 161 reflects the receiving light 100b from the optical fiber 121 and transmits the transmitting light 100a from the light-emitting component 130. The second optical filter 162 transmits the receiving light 100b from the optical fiber 121 and reflects the transmitting light 100a from the light-emitting component 130. Therefore, while the transmitting light 100a produced by the light-emitting component 130 is transmitted by the first optical filter 161 to the optical fiber 121, the receiving light 100b from the optical fiber 121 is reflected by the first optical filter 161, changing the path 90 degrees, after which the light falls substantially perpendicular incident on the second optical filter 162 and is thereby transmitted to the light-receiving component 140.

Thus, the optical module 100 according to this embodiment has the above-described configuration. Since the transmitting light 100a is reflected by the second optical filter 162, even if the transmitting light 100a should stray and scatter in the main housing 110, the stray light is blocked by the second optical filter 162 from reaching the light-receiving component 140. This enables noise caused by stray light to be reduced. Moreover, because in the case of this optical module 100 the two optical filters 161 and 162 are held by just the one filter support member 150, it is possible to keep down the number of parts. Having the two optical filters 161 and 162 held by the one filter support member 150 also provides good positioning accuracy, since there is almost no deviation in the positional relationship of the two filters.

Figure 4:
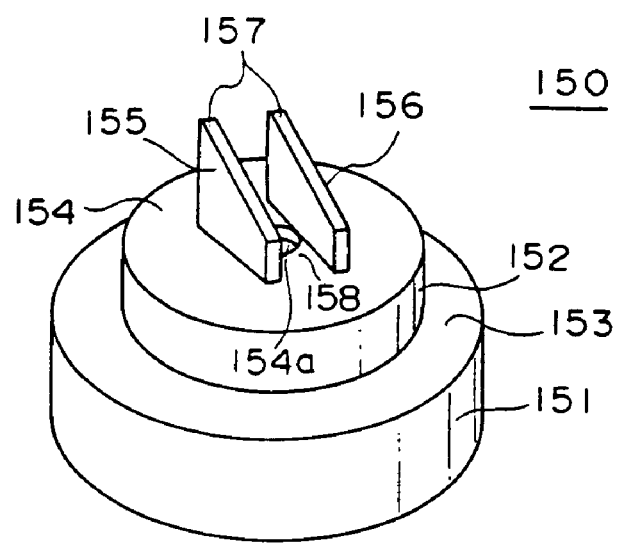
FIG. 4 is a perspective view showing another structure of the filter support member.
Figure 5:
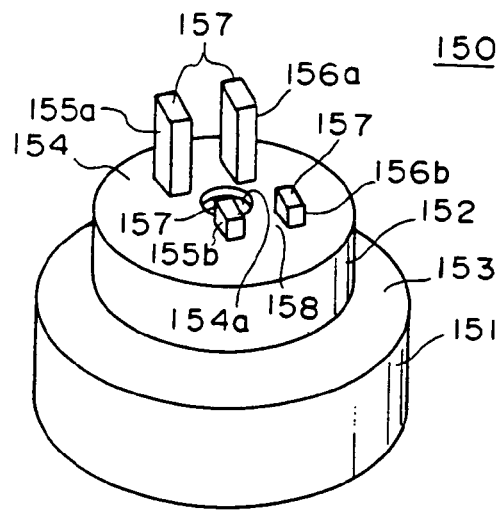
FIG. 5 is a perspective view showing still another structure of the filter support member.
Figure 6:
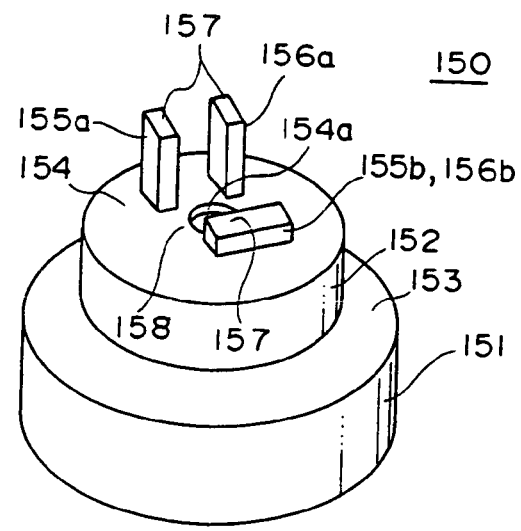
FIG. 6 is a perspective view showing still another structure of the filter support member.

The filter support member 150 is not limited to the structure shown in FIG. 3, but can instead have various other types of structure. As shown in FIG. 4, for example, in shape, the first and second projecting portion 155 and 156 can be flat plates, or as shown in FIG. 5, the first projecting portion 155 can be divided to form the two projecting portions 155a and 155b and the second projecting portion 156 can be divided to form the two projecting portions 156a and 156b. Moreover, to the extent that the path of the transmitting light 100a is not blocked, part of the first projecting portion 155 (155b) and part of the second projecting portion 156 (156b) can be integrated into one piece, as shown in FIG. 6.

Figure 7:
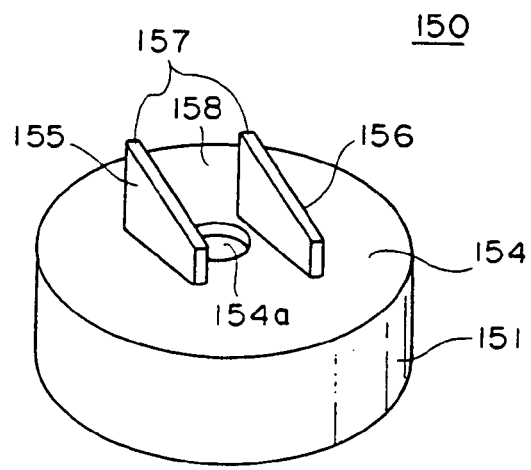
FIG. 7 is a perspective view showing still another structure of the filter support member.

Or, as shown in FIG. 7, the second cylindrical portion can be omitted, to the extent that there is no interference with the lens 142 included in the light-receiving component 140. In this case, one end of the cylindrical portion 151 would form the filter mounting portion 154, and the cylindrical portion 151 and the filter mounting portion 154 would comprise the cap portion. The structure shown in FIG. 7 is simpler than those of FIGS. 3 to 6, and as such, is suitable when the light-receiving component 140 does not contain a lens 142, or when the light-receiving component 140 does contain a lens 142 that does not project.

Figure 8:
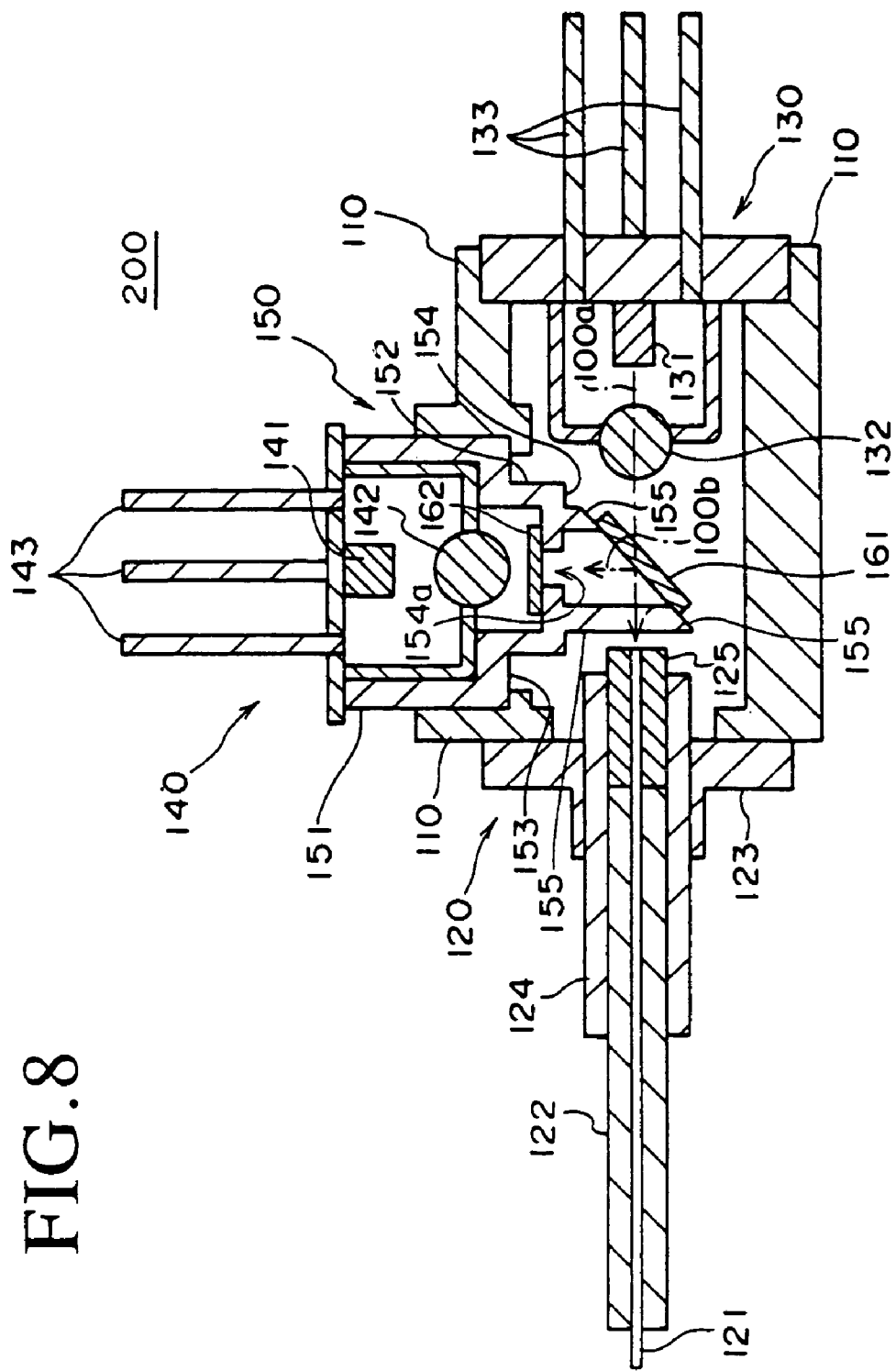
FIG. 8 is a cross-sectional view of the configuration of an optical module according to another preferred embodiment of the present invention.

FIG. 8 is a cross-sectional view of the configuration of an optical module 200 according to another preferred embodiment of the present invention.

Although the optical module 200 uses the same parts as the optical module 100 shown in FIG. 1, the second optical filter 162 is mounted in a different position. Specifically, in the case of the optical module 100 the second optical filter 162 is mounted on the side of the filter mounting portion 154 having the first and second projecting portions 155 and 156, in the case of the optical module 200, the filter 162 sits on the surface on the side opposite to the filter mounting portion 154. The effect obtained with this configuration is the same as that obtained with the optical module 100 of FIG. 1.

Figure 9:
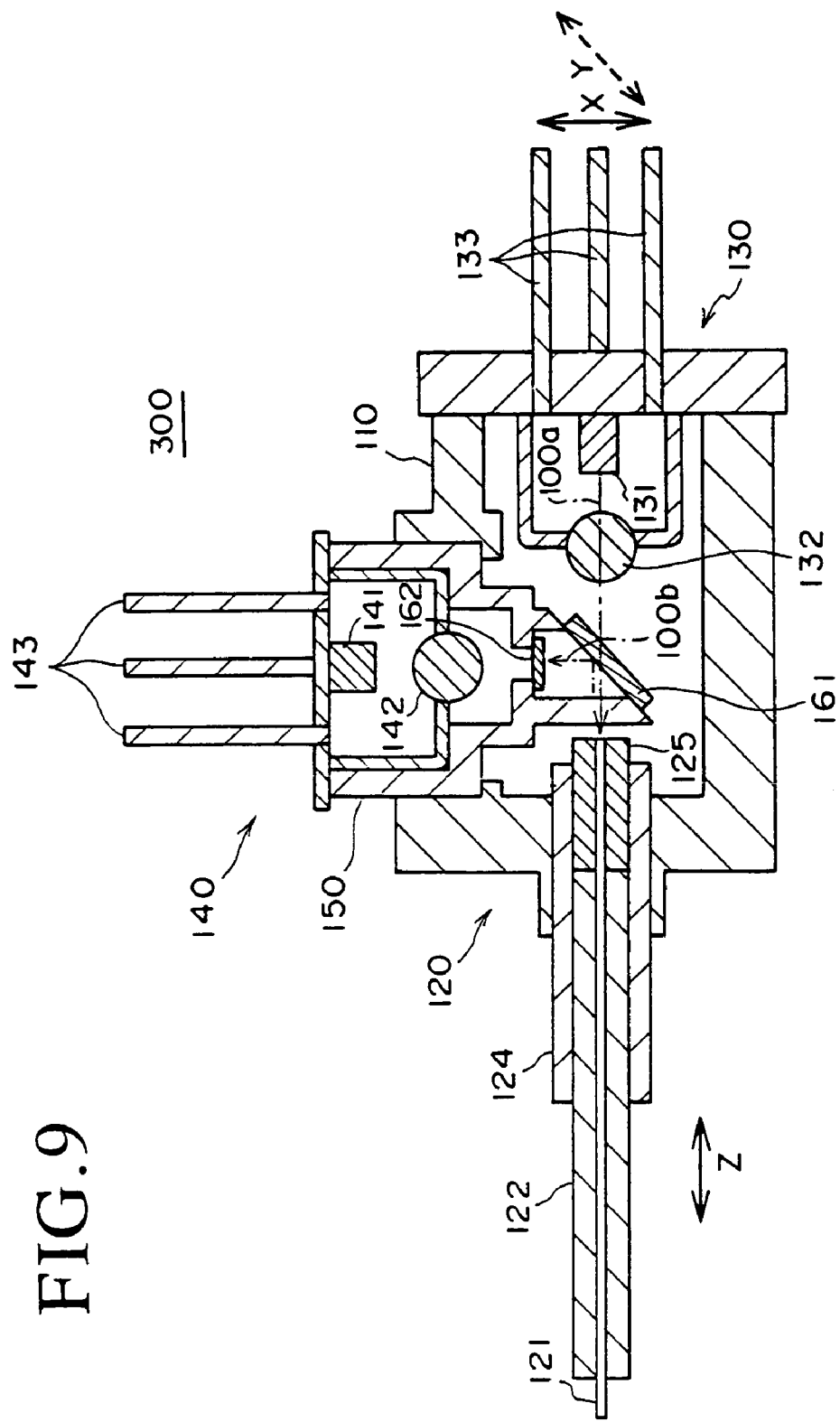
FIG. 9 is a cross-sectional view of the configuration of an optical module according to still another preferred embodiment of the present invention.

FIG. 9 is a cross-sectional view of the configuration of an optical module 300 according to still another preferred embodiment of the present invention.

What is different from the optical module 100 of FIG. 1 is that the optical module 300 does not have the first slider 123. Instead, the second attachment section (112) can slidably move with respect to the main housing 110, allowing the position of the light-emitting component 130 to be moved in the X direction (vertically with respect to FIG. 9) and the Y direction (normal to the page on which FIG. 9 is drawn). Thus, in the case of the optical module 300, positional adjustment in the X and Y directions can be done using the light-emitting component 130, and positional adjustment in the Z direction can be done using the second slider 124.

Figure 10:
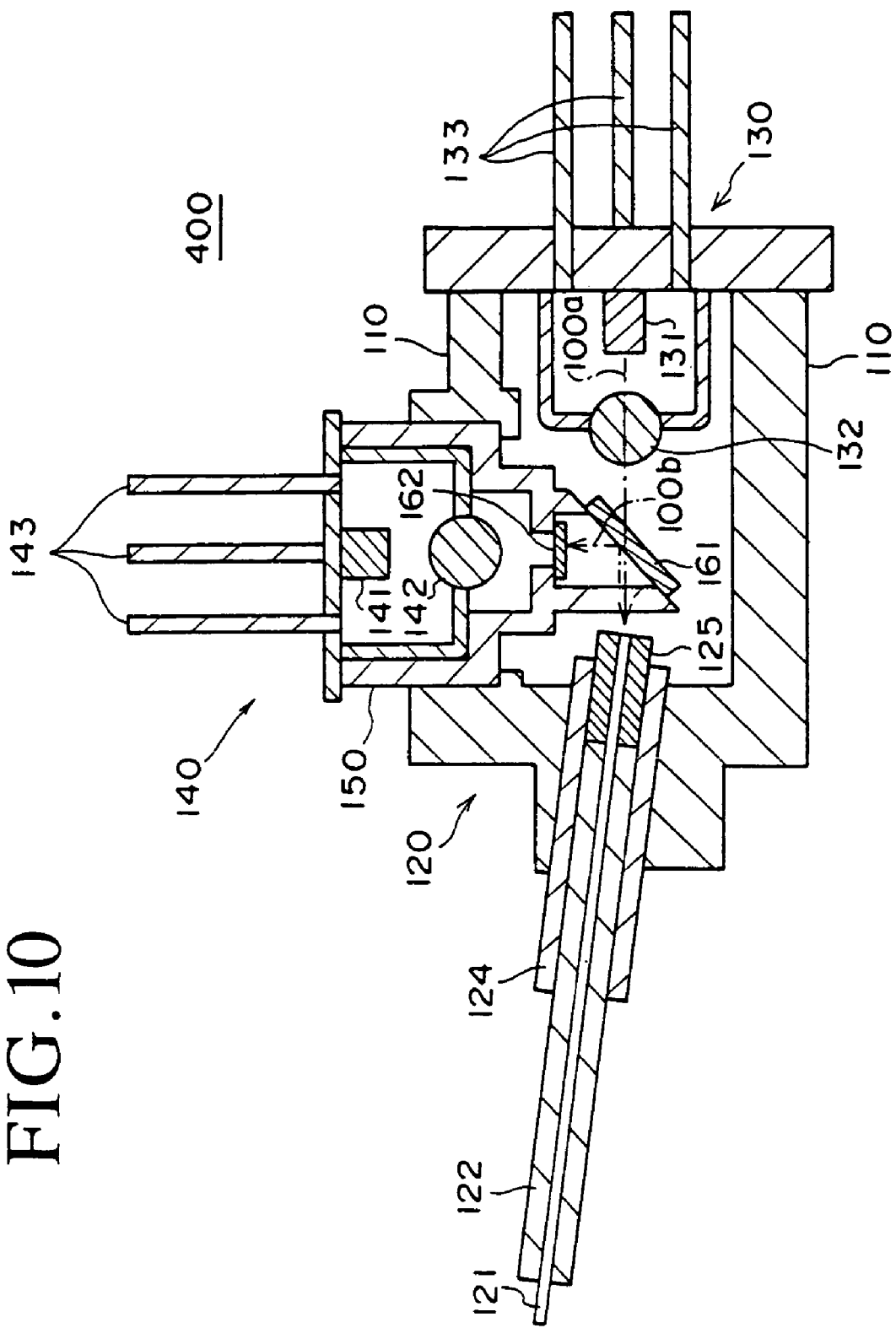
FIG. 10 is a cross-sectional view of the configuration of an optical module according to still another preferred embodiment of the present invention.

FIG. 10 is a cross-sectional view of the configuration of an optical module 400 according to still another preferred embodiment of the present invention.

The optical module 400 differs from the optical module 300 of FIG. 9 in that the fiber support component 120 is inserted at a predetermined tilt to the straight line between the first attachment section (111) and the second attachment section (112). That is, in the case of the optical module 400, the optical fiber 121 can be affixed at a predetermined tilt to the straight line. This is done so that when the optical fiber is terminated at an inclined angle to the optical axis rather than perpendicular thereto, in order to reduce the effects of reflection at the terminal portion of the optical fiber 121, the effect of the inclination can be compensated to efficiently couple the optical fiber 121 to the light-emitting component 130. An efficient coupling can be ensured by setting the tilt of the optical fiber 121 at no more than 5 degrees.

Figure 11:
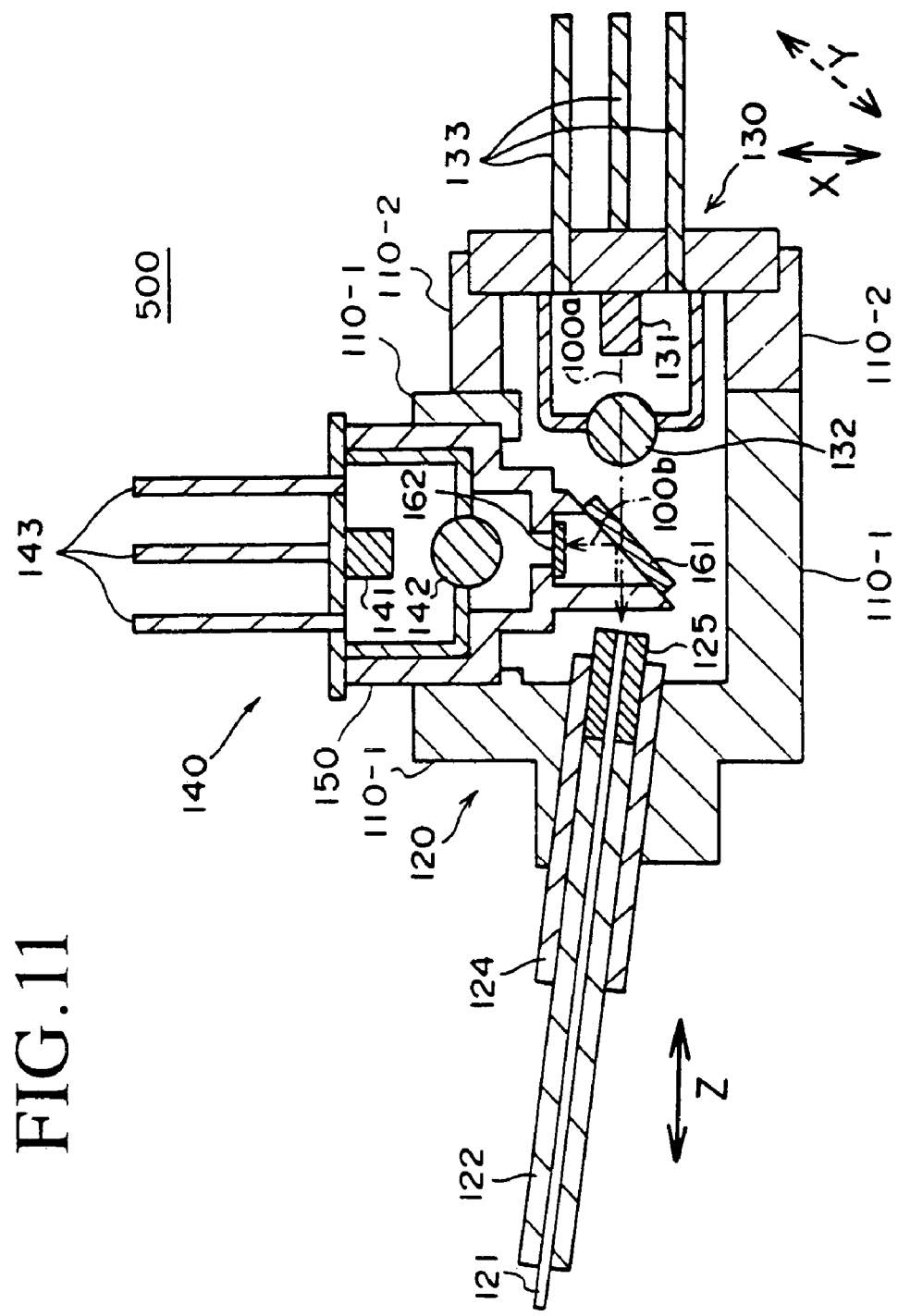
FIG. 11 is a cross-sectional view of the configuration of an optical module according to still another preferred embodiment of the present invention.
Figure 12:
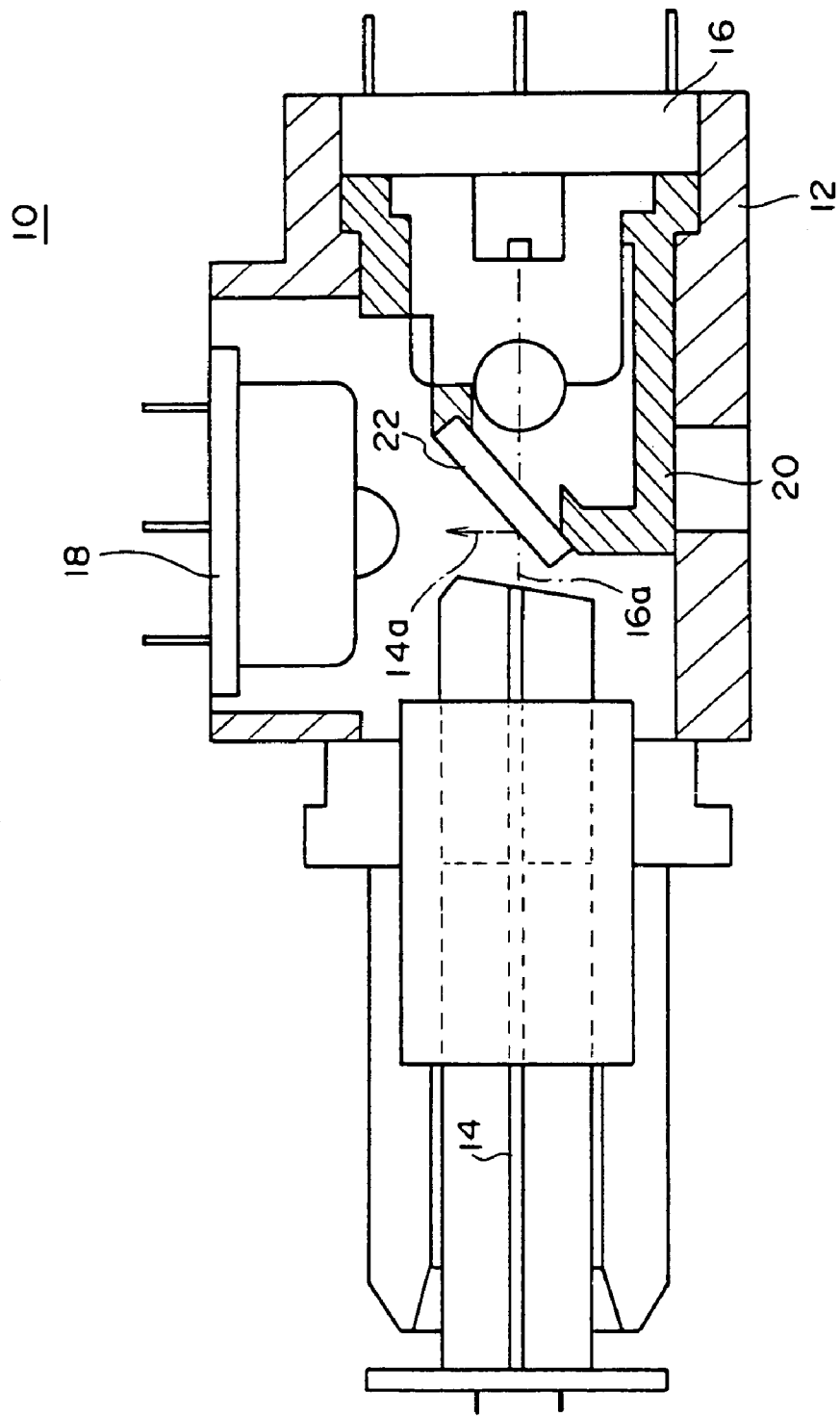
FIG. 12 is a cross-sectional view of the structure of a conventional optical module 10 described in Japanese Utility Model Registration No. 3,095,902.

FIG. 11 is a cross-sectional view of the configuration of an optical module 500 according to still another preferred embodiment of the present invention.

The optical module 500 differs from the optical module 400 of FIG. 10 in that the main housing 110 is comprised of two portions, 110-1 and 110-2, which can be mutually slidably moved in the X direction (vertically with respect to FIG. 11) and the Y direction (normal to the page on which FIG. 11 is drawn). Thus, in the case of the optical module 500, positional adjustment in the X and Y directions is done using the two main housing portions 110-1 and 110-2, and positional adjustment in the Z direction is done using the second slider 124.

The present invention is in no way limited to the aforementioned embodiments, but rather various modifications are possible within the scope of the invention as recited in the claims, and naturally these modifications are included within the scope of the invention.

For example, although in the foregoing the third attachment section 113 is described as being provided at an angle of 90 degrees to a straight line 110a connecting the first attachment section 111 and the second attachment section 112 (see FIG. 2), with the first optical filter 161 being maintained at an angle of 45 degrees to the line 110a, so long as the latter angle is half the former angle, the respective angles do not have to be 90 degrees and 45 degrees.

What is claimed is:

1. An optical module, comprising:
   a main housing having a first attachment section that can affix an optical fiber, a second attachment section located in opposition to said first attachment section, and a third attachment section provided at a first angle to a straight line which connects said first and second attachment sections;
   a light-emitting component supported by said second attachment section;
   a light-receiving component supported by said third attachment section;
   a filter support member being a cap that optically isolates the light-receiving component from the main housing, the filter support member supported by said third attachment section; and first and second optical filters supported by said filter support member, said filter support member having a first surface which has a second angle different from said first angle to said straight line and a second surface which is substantially perpendicular to said light-receiving component, said first optical filter being mounted on said first surface of said filter support member, said second optical filter being mounted on said second surface of said filter support member, wherein the second optical filter mounted on the second surface and the cap eliminate all stray or scattered light within the main housing, that is not incident on the second optical filter, from reaching the light-receiving component.

2. The optical module as claimed in claim 1, wherein said second angle is half of said first angle.

3. The optical module as claimed in claim 2, wherein said first angle is substantially 90 degrees and said second angle is substantially 45 degrees.

4. The optical module as claimed in claim 1, wherein said first optical filter can reflect a light supplied from said optical fiber and can transmit a light emitted from said light-emitting component.

5. The optical module as claimed in claim 1, wherein said second optical filter can transmit a light supplied from said optical fiber and can reflect a light emitted from said light-emitting component.

6. The optical module as claimed in claim 1, wherein said cap portion of said filter support member being put into said third attachment section, said light-receiving component being put into said cap portion of said filter support member.

7. The optical module as claimed in claim 6, wherein said filter support member further has first and second projecting portions each of which has said first surface, said straight line passing between said first and second projecting portions.

8. The optical module as claimed in claim 6, wherein said cap portion of said filter support member includes a cylindrical portion intervening between said third attachment section of said main housing and said light-receiving component and a stop portion provided one end of said cylindrical portion that functions as a stop for said light-receiving component.

9. The optical module as claimed in claim 6, wherein said cap portion of said filter support member includes a first cylindrical portion intervening between said third attachment section of said main housing and said light-receiving component, a second cylindrical portion having smaller diameter than that of said first cylindrical portion, a stop portion connecting said first and second cylindrical portions, and a filter mounting portion provided one end of said second cylindrical portion having an opening, in which said stop portion functions as a stop for said light-receiving component and said filter mounting portion has said second surface.

10. The optical module as claimed in claim 1, further comprising a slider attached to said first attachment section which can adjust a position of said optical fiber in a direction along an optical axis.

11. The optical module as claimed in claim 10, wherein said slider has a cylindrical structure into which a ferrule can be inserted.

12. The optical module as claimed in claim 10, further comprising another slider attached to said first attachment section which can adjust a position of said optical fiber in a direction perpendicular to said optical axis.

13. The optical module as claimed in claim 1, wherein said second attachment section can adjust a position of said light-emitting component in a direction perpendicular to said optical axis.

14. The optical module as claimed in claim 1, wherein said main housing has a cylindrical structure, said first attachment section being located at one end of said main housing and said second attachment section being located at an opposite end of said main housing.

15. The optical module as claimed in claim 6, wherein said main housing has a cavity at said third attachment section to accommodate at least part of said cap portion of said filter support member.

16. The optical module as claimed in claim 1, wherein said first attachment section sets optical fiber with a tilt for said straight line.

17. The optical module as claimed in claim 16, wherein said tilt is less than or equal to 5 degrees.

18. An optical module, comprising:
a housing;
an optical light-receiving component; and
a coupling and mounting means attached to said housing and coupled to said optical light-receiving component, so as to couple said optical light-receiving component to the housing and for mounting one or more optical filters in proper alignment, wherein the one or more optical filters are mounted to the coupling and mounting means so as to be aligned with the optical light-receiving component and filter an optical communication signal sent to or from an optical fiber while eliminating all stray or scattered light not incident on the one or more optical filters within said housing from reaching said optical light-receiving component.

19. The optical module as claimed in claim 18, wherein said coupling and mounting means has a first proximal end and a second distal end opposite the proximal end, and the optical light-receiving component is coupled to the first proximal end and the two or more optical filters are mounted to the distal end of said coupling and mounting means.

20. An optical module comprising;
a housing;
a first light communication member coupled to the housing at a first location;
a second light communication member coupled to the housing at a second location;
a filter support member attached to the housing;
a first filter attached to the filter support member at a first angle;
a second filter attached to the filter support member at a second angle; and
a third light communication member coupled to the filter support member, wherein the filter support member and the second filter blocks undesired stray and scattered light from the first light communication member within the housing that is not incident on the one or more optical filters from reaching the third light communication member.

* * * * *